US006635153B1

(12) United States Patent
Whitehead

(10) Patent No.: US 6,635,153 B1
(45) Date of Patent: Oct. 21, 2003

(54) AIR PURIFICATION DEVICE

(75) Inventor: John C. Whitehead, Stockport (GB)

(73) Assignee: The Victoria University of Manchester, Manchester (GB)

( * ) Notice: Subject to any disclaimer, the term of this patent is extended or adjusted under 35 U.S.C. 154(b) by 0 days.

(21) Appl. No.: 09/786,795

(22) PCT Filed: Sep. 9, 1999

(86) PCT No.: PCT/GB99/03006

§ 371 (c)(1),
(2), (4) Date: Jul. 23, 2001

(87) PCT Pub. No.: WO00/14010

PCT Pub. Date: Mar. 16, 2000

(30) Foreign Application Priority Data

Sep. 9, 1998 (GB) ............................................... 9819540

(51) Int. Cl.⁷ .......................... C01B 13/11; B01J 19/08; B01D 53/32; B01D 53/34
(52) U.S. Cl. ..................... 204/176; 422/22; 422/186.04; 422/186.07; 422/186.15; 422/906
(58) Field of Search .................... 422/186.04, 22, 422/186.07, 186.15, 906; 204/176

(56) References Cited

U.S. PATENT DOCUMENTS

| 3,607,709 A | * | 9/1971 | Rice ........................ 422/186.07 |
| 3,654,126 A | | 4/1972 | McNabney et al. |
| 4,737,885 A | | 4/1988 | Akutsu |
| 5,587,131 A | * | 12/1996 | Malkin et al. ............ 422/186.07 |

FOREIGN PATENT DOCUMENTS

| GB | 2 296 172 | 6/1996 |
| JP | 63267419 | 11/1988 |
| JP | 10101308 | 4/1998 |
| JP | 01103903 | 4/1999 |
| WO | WO91/18662 | 12/1991 |

OTHER PUBLICATIONS

Patent Abstracts of Japan vol. 013, No. 079 (C–571), Feb. 1989 & JP63 267419 A (Wako Kasei Kogyo KK; Others: 01), Nov. 1988.
Patent Abstracts of Japan vol. 1998, No. 09, Jul. 1998 & JP10 101308 A (Kobe Steel Ltd), Apr. 1998.
Patent Abstracts of Japan vol. 013, No. 326 (C–620), Jul. 1989 & JP01 103903A (Teru Kyushu KK), Apr. 1989.

* cited by examiner

*Primary Examiner*—David A. Reifsnyder
(74) *Attorney, Agent, or Firm*—Nixon & Vanderhye P.C.

(57) ABSTRACT

An apparatus for purifying air comprising two electrodes having a dielectric material such as glass extending therebetween. The dielectric material is air permeable, for example, in the form of a bed of discrete particles such as glass beads. The electrodes are also air permeable, allowing the air to flow through the electrodes and dielectric. Ozone is generated by discharge at points of contact of the dielectric particles. Airflow through the device is improved, allowing greater cooling, and higher volumes of airflow but at lower concentrations of ozone production than with prior art devices, thus reducing toxicity.

14 Claims, 1 Drawing Sheet

AIR PURIFICATION DEVICE

Figure 1:
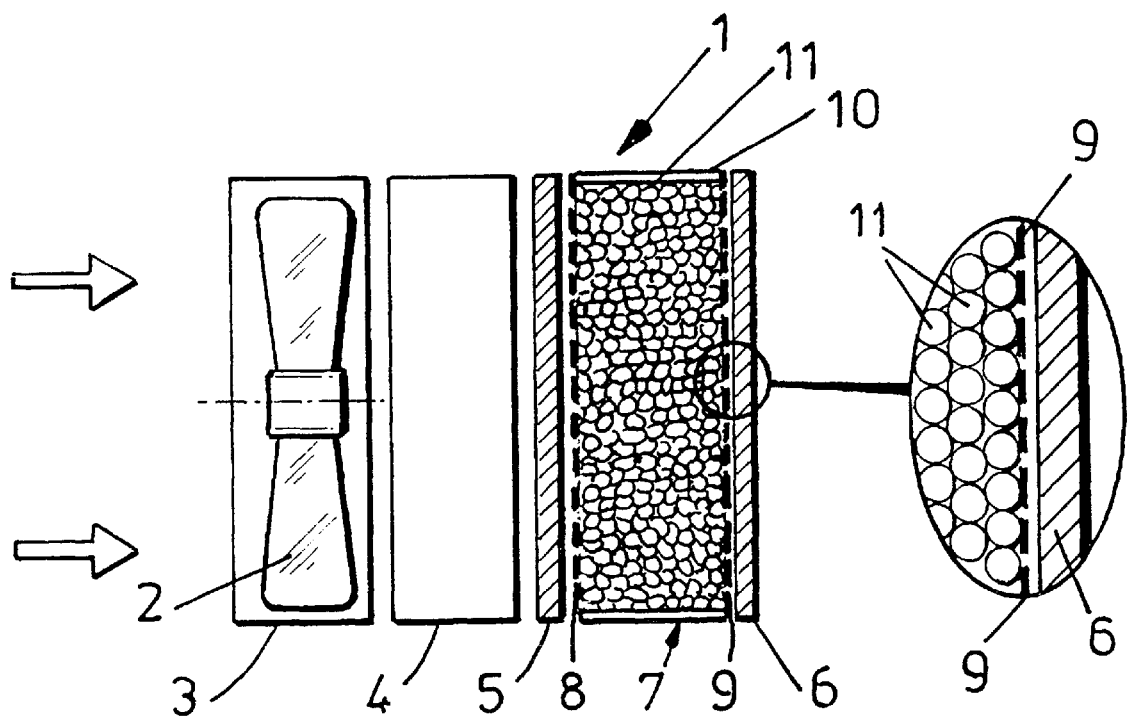

This is a 371 of PCT/GB99/03006, filed Sep. 9, 1999, which claims priority from GB 9819540.7, filed Sep. 9, 1998.

This invention relates to an air purification device, and particularly but not exclusively to an air purification device which generates ozone.

By air purification device is meant a device which may be used to improve the quality of air, by removal of at least a portion of pollutants, odours, airborne particles, bacteria and/or the like from the air. Such a device may be used to clean exhaust gases from motor vehicles and other polluting processes, for sterilization purposes in "clean" manufacturing facilities, hospitals, food storage and preparation areas, etc.

It is known that the introduction of ozone into air, typically by electrical generation of ozone, may be used as a way of purifying the air. Ozone is poisonous to bacteria and microorganisms, and also oxidises many organic compounds that may be present in odours, however as ozone is also toxic to humans, its use as an air purifier has had limited application.

Conventionally, ozone generators are operated using the "silent discharge" or "dielectric barrier principle" to convert oxygen into ozone. In such generators, the feedstock is typically oxygen gas because the use of air in a conventional device can lead to the production of undesirable end products such as oxides of nitrogen (e.g. $NO_x$). The use of air as a feedstock can however be achieved using generators of the dielectric barrier type provided that they are operated at a high frequency. Such high frequency devices comprise two electrodes having a gap between them, air being passed through the gap so that electrical discharge across the electrodes causes the oxygen in the air to be converted to ozone. These devices generally have very narrow gaps between the electrodes and thus offer considerable resistance to the flow of air through the device, requiring a pump to provide airflow.

When such devices are used in air purification applications, they generally have to be left running for a long period of time (e.g. overnight) so that enough air can pass through the electrodes to be converted to ozone. The concentrations of ozone produced can be quite high and it is therefore necessary to prevent access to the area that is being purified. Conventional devices can thus only be used in confined spaces that can be controlled easily.

GB-A-2296172 discloses an ozone generator having dielectric spacers between the electrodes. The spacers maintain the spacing between the electrodes, which is important as the pressure between the electrodes can become raised above atmospheric pressure, causing the electrodes to bow or warp. The gap between the electrodes is of the order of a few millimeters or less, to help reduce the voltage required to establish a corona discharge. In some embodiments, an open dielectric foam, a dielectric filament material or irregularly spaced dielectric particles are placed in the electrode gap around the spacers, to provide an impedance to the flow of gas through the electrode gap so that gas flow between the electrodes and hence corona discharge is uniform. The air flow through the device is not high enough to enable the apparatus to be used as an air purification device.

The known devices are also often prone to overheating which reduces the efficiency of ozone production as ozone thermally degrades above about 50° C. and can cause failure of the discharge electrode arrangement due to distortion such as bowing or warping.

It is known from U.S. Pat. No. 3,654,126 to use a fluidized bed of a dielectric such as sand to provide cooling to the electrodes and thereby increase the efficiency of ozone generation. The sand is fluidized by means of a high rate of gas flow passing between the electrodes. However the device described in this prior publication is bulky, expensive and mechanically complex. It is thus not suitable for use in air purification applications.

It is an object of the present invention to provide an air purification device which obviates or mitigates some or all of the problems mentioned with prior art devices.

According to a first aspect of the present invention there is provided an apparatus for purifying air comprising two electrodes having a dielectric material therebetween and means for applying a potential difference across the electrodes, wherein the electrodes are air permeable and the dielectric material is in the form of an air permeable, fixed bed and wherein means are provided to provide air flow through one electrode, across the fixed bed of dielectric material and through the other electrode.

According to a second aspect of the present invention there is provided a method of purifying air comprising passing the air through an air permeable electrode, an air permeable fixed bed of dielectric material and a second air permeable electrode whilst applying a potential difference across the bed to convert oxygen in the air to ozone.

The term "fixed bed" is intended to describe a material that extends between the electrodes so that it does not move in normal usage of the device but which is air permeable so that air may flow through gaps present therein. The term is intended to cover inter alia a bed of discrete particles, a foam, a sponge-like structure, and a bed of elongate elements such as filaments arranged in a contacting relationship with air gaps therebetween.

The invention causes air to flow through the air permeable electrodes and dielectric material, preferably in a direction parallel to the applied electric field, thus substantially increasing airflow through the device. This means that a simple fan may be used to push air through the device, rather than an expensive air pump. The air purification device of the present invention thus generates ozone with a high volume of airflow, but in low concentrations, eliminating problems of exceeding toxicity levels in "populated" areas.

Cooling of the device, which increases the efficiency of ozone generation, is achieved by the use of a high air flow through the device, which is not possible with a solid, impermeable dielectric material, and without the need to fluidize a particle bed as described in the prior art. Cooling is thus achieved without expensive and bulky fluidization apparatus or air pumps or cooling water.

The use of the fixed bed also allows discharge to take at the points of contact of the dielectric (if the dielectric is in the form of discrete particles) so that the discharge across the electrodes is uniform. As a result, the spacing between the electrodes may be increased compared to the prior art devices, allowing greater airflow through the device. The fixed bed reduces level of airborne pollutants (especially particulates such as smoke, dust, soot, etc; aerosols; and bacteria) by electrostatic dust precipitation and by the chemical processes of ozonolysis, oxidation and sterilisation, and by the particles being burnt off due to electrical discharge at the points of contact of the dielectric.

The electrodes may be formed of a metal gauze or mesh. Suitable metals include steel and nickel.

The dielectric material may be any suitable material, but preferably has a dielectric constant less than 100, and more preferably less than 20. The dielectric material is preferably glass. The use of a material with a reasonably low dielectric constant, such as glass, allows for cost savings over dielectric materials having a higher dielectric constant, whilst still allowing the device to be efficient enough for use in air purification applications. Silica, alumina or another suitable dielectric (zirconia, sapphire, etc.) could be used in place of glass. Alternatively, materials such as barium titanate, which has a dielectric constant of 1000 may be used as the dielectric material, as it may be obtained at a relatively low cost.

Preferably the dielectric material is formed of a bed of discrete bodies in a contacting relationship. The discrete bodies are preferably particles, preferably regularly shaped particles and more preferably beads. The diameter of the beads is preferably about 1 mm to 6 mm. Glass wool, chips, or extruded foam could be used in place of beads provided that air permeability is retained and that elements of the dielectric material are in a contacting relationship, although regularly spaced beads give an advantage in that better airflow is allowed through the dielectric bed.

The potential difference applied across the electrodes may be $V_{pk-pk}$=10–20 kV and 10–15 kHz, although voltage such as mains at 50 Hz or 60 Hz could be used.

Figure 2:
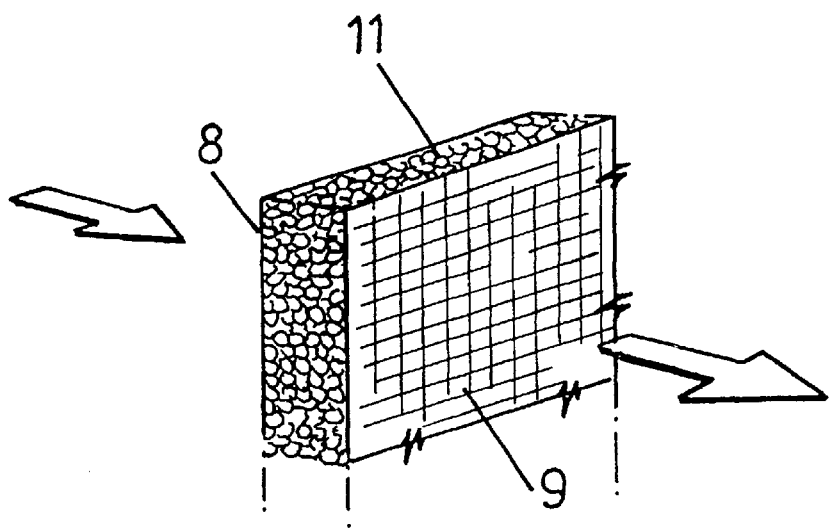

An embodiment of the present invention will now be described by way of example, with reference to the accompanying drawings, in which:

FIG. 1 is an expanded, schematic cross-sectional view of an air purifier according to the present invention; and FIG. 2 is a schematic perspective view of a packed bed electrode according to the present invention.

Referring to the drawings, there is illustrated an air purifier 1 comprising a fan 2 in a housing 3, downstream of which is a spacer 4, and retaining grids 5 and 6. A pellet bed 7 is arranged between the retaining grids such that grid 5 is upstream and grid 6 is downstream of the pellet bed 7. Electrodes 8, 9 are also provided with electrode 8 situated between retaining grid 5 and pellet bed 7, with electrode 9 situated between retaining grid 6 and the pellet bed 7.

The fan 2 and housing 3 may be of any suitable type. In experiments a 240-volt fan in a square cross-section housing 3 having dimensions of 120 mm×120 mm was used. The spacer 4 may be of Perspex and should preferably have the same cross-sectional dimensions as the fan housing 3. A spacer having 120 mm×120 mm external dimensions with a 95 mm×95 mm internal cut-out and having a thickness of 1.8 cm was successfully used in experiments.

Retaining grids 5 and 6 are of a plastics material having the same cross-sectional dimensions as the fan housing 3 and spacer 4. The retaining grids are to provide reinforcement to the pellet bed 7 and so must have as many holes as possible to provide a good air flow through the device but must also retain enough rigidity to provide the required strengthening to the pellet bed 7.

Pellet bed 7 comprises two gauze electrodes 8, 9 separated by a Perspex spacer 10. The spacer 10 is of a similar shape to spacer 4, to create a housing for pellet bed 7. Glass beads 11 are packed into the space between the electrodes 8, 9 created by the spacer 10. Gauze electrode 8 is of high voltage steel high transmittance gauze, although may be formed of nickel, such gauzes being available as radio frequency interference screens. The electrode is made using a basic size gauze of 120 mm×120 mm, which is trimmed by 5 mm around each edge, the edges then being sealed with epoxy. The gauze is sealed between retaining grid 5 and the Perspex spacer 10 with silicone rubber compound. A high voltage cable (not shown) is attached to the gauze by solder and epoxy overlayer. Gauze electrode 9 is similar to gauze electrode 8 except that epoxy edging need not be applied to the gauze. A standard earth lead (not shown) is attached to the electrode instead of the high voltage cable.

The glass beads 11 are packed into the interior of pellet bed 7 formed between the electrodes 8, 9 and Perspex spacer 10. The beads 11 may be 6 mm diameter and are preferably packed in at least two layers. The spacing between the beads allows air to flow through the bed 7.

The ozone generator 1 would in use be surrounded by a housing having an air inlet and an air outlet, and would have a power supply and operating switches. These additional features are not shown in the drawings, as they are comprised of standard components. A timer mechanism may also be incorporated in the device.

The size of glass particle used in the device is not crucial, and particles between 1 mm and 6 mm diameter can be used successfully. With particles of a small size, however, the airflow through the device is restricted. The use of glass rather than a material having a high dielectric constant does reduce the efficiency at which ozone is generated, but in an air quality improvement device high rates of production of ozone could be extremely dangerous if someone were to enter the area being cleaned before the ozone had degraded or dissipated. Efficiency of ozone production is therefore not required to be very high. Glass is also a cheap substance, which gives a significant cost advantage.

In order to further reduce the toxicity problems associated with ozone generation, a chamber could be attached to the device downstream of the packed bed in which the reaction of ozone with airborne contaminants could be allowed to take place. A further metallic gauze or grid downstream of the reaction chamber is used to break down the ozone before the air is returned to the room. This gauze could also be coated with a suitable material for deactivating ozone.

A coarse filter could be added to the device upstream of the fan, to remove large particles from the air.

In use, the apparatus is placed in a room or other location where the air is to be cleaned, either for the elimination of odours or to remove pollutants, bacteria or other contaminants. The fan 2 is switched on together with the voltage supply to the pellet bed 7. The fan causes air to be pushed through the bed 7 whilst the electrodes 8,9 and the glass particles 11 cause ozone to be generated from the air by discharge due to a high frequency electric field being generated across bed 7, in accordance with the known discharge principles.

The voltage applied to the device is typically $V_{pk-pk}$=10–20 kV and 10–15 kHz. High voltage such as mains at 50 Hz or 60 Hz could also be used.

The apparatus is left running for a sufficient length of time for the ozone generated to have purified the air. By air purification is meant an improvement in the quality of the air due to the removal of at least some of the airborne particulate matter, pollutants and odours that was initially present in the air. The electric discharge created in the packed bed will also destroy some particulate matter that may be present in the air either by burning it off or by means of electrostatic precipitation onto the dielectric particles, which will further improve the air quality.

As the air flows through the gauze electrodes rather than having to flow through the gap between the electrodes, the airflow rate through the device is significantly improved over the prior art devices. The packed bed of dielectric means that electric discharge takes place at the points of contact between the dielectric particles, making the discharge very uniform and allowing the spacing between the electrodes to be increased.

What is claimed is:

1. An apparatus for purifying air comprising:
   (i) a pair of opposed, spaced air permeable electrodes,
   (ii) an air permeable fixed bed which is comprised of discrete particles of a dielectric material having a dielectric constant of less than 20, and which extends between the electrodes, said particles being in contacting relationship,
   (iii) means for applying a potential difference across the electrodes to provide an electric field in a direction between the electrodes, and
   (iv) means for providing an air flow through one electrode, across the fixed bed of dielectric material and through the other electrode.

2. An apparatus according to claim 1, wherein the means to provide air flow through the apparatus is adapted to provide air flow in a direction parallel to the electric field generated to the applied potential difference.

3. An apparatus according to claim 1, wherein the means for applying potential difference across the electrodes is adapted to provide a potential difference of $V_{pk-pk}$=10–20 kV at 10–15 kHz.

4. An apparatus according to claim 1, wherein the means to provide air flow through the apparatus is a fan.

5. An apparatus according to claim 1, wherein the electrodes are formed of a metal gauze or mesh.

6. An apparatus according to claim 5, wherein the metal gauze or mesh is comprised of steel or nickel.

7. An apparatus according to claim 6, wherein the dielectric material is glass.

8. An apparatus according to claim 1, wherein the fixed bed of dielectric material comprises a bed of discrete particles, a foam, a sponge-like structure, or a bed of elongate elements arranged in a contacting relationship with air gaps therebetween.

9. An apparatus according to claim 8, wherein the dielectric material comprises discrete particles, such discrete particles being regularly shaped beads.

10. An apparatus according to claim 9, wherein the beads have a diameter of 1 mm to 6 mm.

11. A method of purifying air comprising passing the air through a first air permeable electrode, through an air permeable fixed bed of discrete particles of a dielectric material having a dielectric constant of less than 20 and through a second air permeable electrode whilst applying a potential difference across the electrodes to generate an electric field in a direction between the electrodes.

12. A method according to claim 11, wherein the air is passed through the electrodes and the bed of dielectric material in a direction parallel to the electric field generated between the electrodes.

13. A method according to claim 11, wherein the potential difference is applied across the electrodes at a voltage of $V_{pk-pk}$=10–20 kV at 10–15 kHz.

14. A method according to claim 11, wherein the air is passed through the electrodes and the bed of dielectric material by means of a fan.

* * * * *